July 19, 1960 — W. A. SMITH ET AL — 2,945,536
FOLDABLE CANOPY-TYPE DOOR
Filed Jan. 22, 1957 — 7 Sheets-Sheet 1 fig. 1 fig. 12 fig. 13 fig. 10 fig. 14

INVENTORS
WESLEY A. SMITH
ROGER E. GINTHER
BY Woodhams Blanchard & Flynn
ATTORNEYS fig. 2

July 19, 1960  W. A. SMITH ET AL  2,945,536
FOLDABLE CANOPY-TYPE DOOR
Filed Jan. 22, 1957  7 Sheets-Sheet 5

INVENTORS
WESLEY A. SMITH
ROGER E. GINTHER
BY
Woodhams Blanchard + Flynn
ATTORNEYS

United States Patent Office 2,945,536
Patented July 19, 1960

2,945,536

FOLDABLE CANOPY-TYPE DOOR

Wesley A. Smith, Detroit, and Roger E. Ginther, Leonard, Mich., assignors to Tilt-A-Door Corporation, Detroit, Mich., a corporation of Michigan Filed Jan. 22, 1957, Ser. No. 635,370

6 Claims. (Cl. 160—189)

This invention relates in general to a horizontally hinged, foldable closure member for an opening in an upright wall and, more particularly, to a counterbalanced, canopy-type door having upper and lower sections which are horizontally hinged to each other and arranged for movement between upright, substantially co-planar positions and horizontal positions adjacent to each other.

The established advantages is a counterbalanced, canopy-type of closure member, such as a garage door, include: simplicity of installation and operation; ease of opening and closing; absence of complicated, space consuming support structure normally found in overhung types of doors; and the automatic weather shield provided by the door when in the open position. However, the present, usual construction of these doors also gives rise to certain problems, which heretofore have not been overcome. These problems grow more acute as the size of the door increases and have accordingly limited the widespread use of these doors to relatively small installations, such as for domestic garages.

Paramount among these problems is the fact that a canopy-type door, which is normally in one piece, extends much further from the building wall upon which it is mounted, when in the open position, than is necessary to provide an adequate weather shield. Instead this extension under adverse weather conditions collects snow and ice which not only impose an excessive strain upon the structure supporting the door, but also create a hazard for the person who may be standing under this extension when the door, thus heavily loaded is closed. At least one safety latch, which is shown in Patent No. 2,579,621, has been devised for preventing the accidental closure of said open door when it becomes loaded with snow or ice. However, neither this nor any other latch provides for the elimination of the potential hazard which is created once the latch has been released and the door is free to swing downwardly. Also arising out of the problem of excessive overhang, is the strain imposed upon both the door and its mounting when it is open during a high wind. This factor alone has discouraged the use of large, canopy-type doors in many regions.

Another problem, which is particularly encountered with the conventional, one piece type of canopy door, occurs where it becomes necessary to open the door when some object, such as snow or a parked vehicle, is disposed near to the front of the door. It is usually necessary to remove the object before the door can be opened, due to the outward arcuate path traversed by its lower edge.

Another problem inherent in one piece canopy-type doors concerns the suction and compression of the air created within the building, upon which the door is mounted, when said door is opened or closed. This pressure problem not only impedes movement of the door, but it may also produce a false indication of closure. Furthermore, the opening of the door is often accompanied by an inwardly directed flow of air under the door, thereby moving dirt and other debris, which collect along the outer edge of the door, into the inner space behind the door. In a similar manner, sudden closure of the door often causes a flow of air in the opposite direction, with corresponding results. This can be extremely aggravating to the user, particularly under conditions of bad weather. Obviously, this problem also becomes more acute as the size of the opening increases.

A further problem, which also increases with the size of the opening, involves the necessity for an increased amount of ballast or counterweighting of the canopy-type of door above its hinge axis. This means that the mechanism for pivotally supporting the door must be considerably increased in strength, beyond the normal requirements for the support of the increased weight of the door alone. Furthermore, an increase in the height of the overall opening, in which a canopy-type door is installed, does not produce an equal increase in the effective opening produced by the door when it is in the open position, due to the fact that additional counterbalancing, and space therefor, is required. It follows from this that, since additional strength is required in both the door and door frame to support the disproportionate increase in weight, the cost must increase correspondingly.

Accordingly, a primary object of this invention is the provision of a counterbalanced, canopy-type closure member, such as a garage door, which has sufficient overhang externally of the structure upon which it is supported to provide an adquate weather shield, but which does not have the excessive overhang normally incident to the one piece, canopy-type of door and which, therefore, renders this general type of door available for application to large openings, such as those found in warehouses, factories, airplane hangars and similar.

A further object of this invention is the provision of a canopy-type garage door, as aforesaid, which can be opened without interference from objects disposed adjacent to either the inner or outer sides of the door near the lower edge thereof, and which can be opened or closed without creating suction or pressure problems.

A further object of this invention is the provision of a canopy-type door, as aforesaid, which, particularly when produced in large sizes, requires much less counterbalancing to produce ease of opening than is required by canopy-type doors of a smaller size when constructed according to present practices.

A further object of this invention is the provision of a canopy-type door, as aforesaid, which can be utilized in large sizes without encountering serious difficulties from inclement weather conditions such as those causing snow or ice loads on the door.

A further object of this invention is the provision of a canopy-type door, as aforesaid, which is relatively simple in structure, which is relatively easy to install, which requires no special tools or special training for such installation, which requires no space-consuming and movement-obstructing support structure for holding said door in the raised position, and which can be installed in any conventional door frame capable of supporting any conventional type of closure member adapted for serving a similar purpose.

A further object of this invention is the provision of a garage door structure, as aforesaid, which can be used in cooperating, multiple units where the opening is, for example, double the width of some smaller, standard opening.

A further object of this invention is the provision of a garage door structure, as aforesaid, having an upper section hingedly supporting a lower section which is provided with means for preventing objectionable distortions, due to the force of gravity acting upon said door during the raising and lowering thereof.

A further object of this invention is the provision of a canopy-type garage door, as aforesaid, which automatically holds itself in the raised position against accidental closure without providing any special latching or other locking means therefor.

Other objects and purposes of this invention will become apparent to persons familiar with this type of equipment upon reading the following specification and examining the accompanying drawings, in which:

Figure 1:
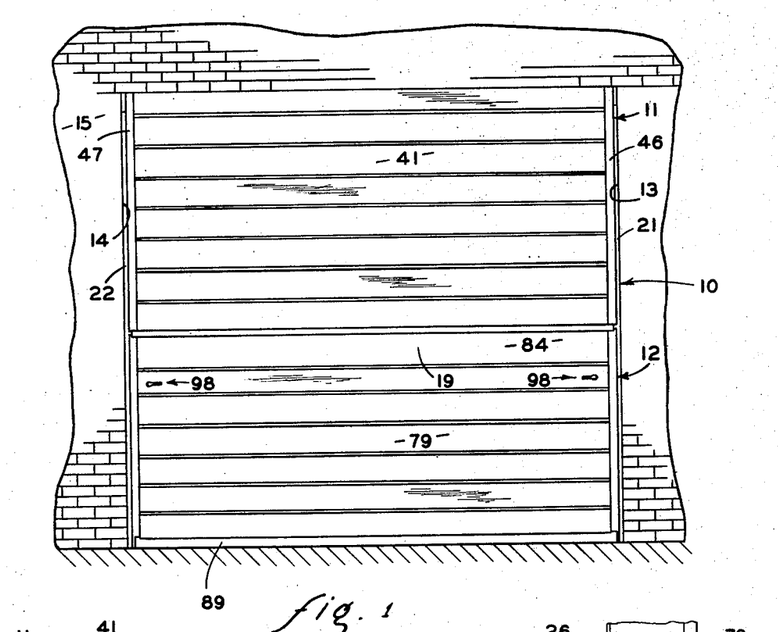
Figure 1 is a front elevational view of a canopy-type door in the closed position with respect to an opening in a wall structure, upon which it is supported, and as viewed from the exterior of said structure.
Figure 2:
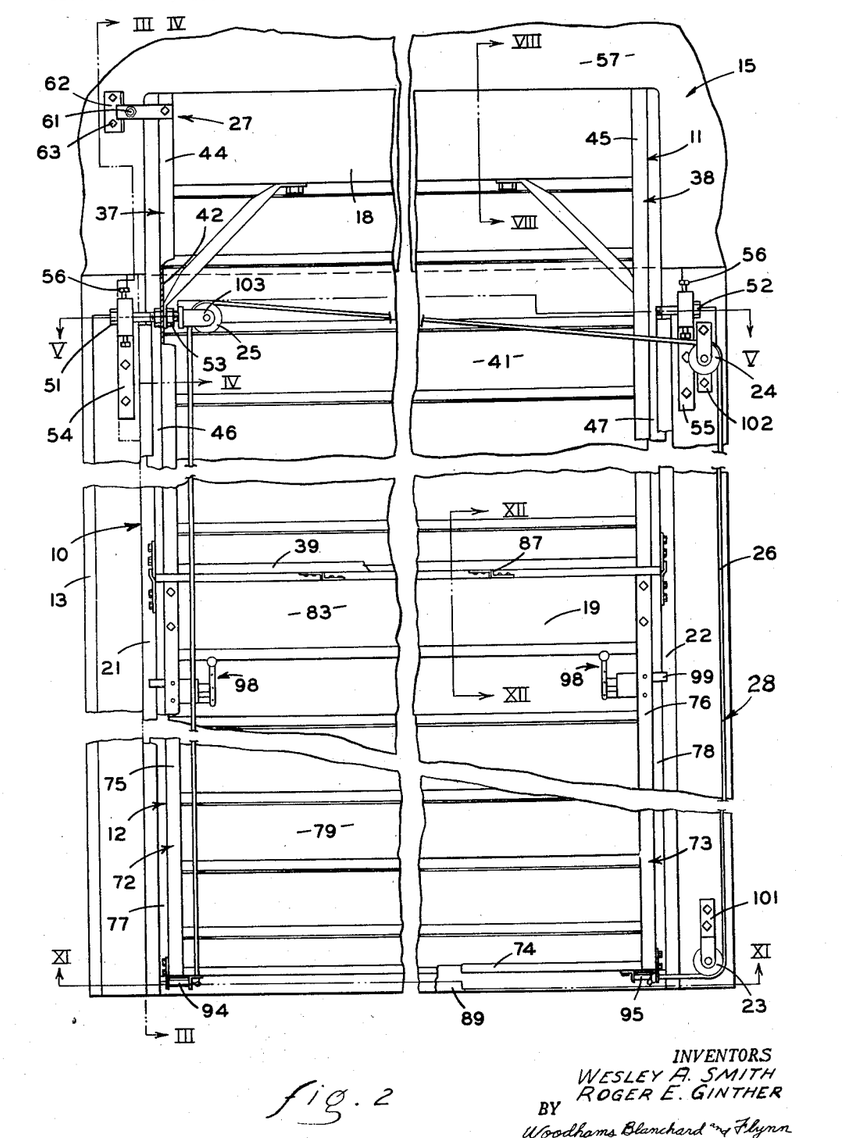
Figure 2 is a broken, rear elevational view showing the interior side of the door in the closed position with respect to a door frame in which it is mounted.

For the purpose of convenience in description, the terms "front," or "exterior" and "rear" or "interior," and derivatives thereof, will correspond to the exterior and interior sides, respectively, of the wall structure with which the door of the invention is associated, the exterior of said door being shown in Figure 1 and the interior being shown in Figure 2. The terms "upper," "lower," "left," "right," and derivatives thereof, will have reference to said door structure, and parts thereof, as viewed from the interior side thereof shown in Figure 2. The terms "inner," "outer," and derivatives thereof, will have reference to the geometric center of said door.

*General description*

A canopy-type closure member, characterizing the invention, is shown in Figures 1, 2, 3 and 4, as a two piece garage door 10, comprised of an upper section 11 and a lower section 12. The upper section 11 is pivotally supported upon the side jambs 13 and 14, near the upper ends thereof, within the upper portion of a door opening in the wall structure 15, which opening is defined by the side jambs 13 and 14 and a head jamb 16. The substantially horizontal, pivotal axis of the upper section, which is located between and spaced from both the upper and lower edges of the upper section, is preferably disposed closer to the upper edge than to the lower edge of said section. Thus, a ballast or counterweight compartment 17 (Figure 8), which is disposed within a torque member 18, is provided at the upper end of the upper section 11 in a manner similar to that disclosed in Patent No. 2,601,565.

The lower section 12 is hingedly supported along its upper edge upon the lower edge of the upper section 11 and may be provided with a torque member 19 along the upper or lower edge thereof, for reasons appearing hereinafter. Guide mechanism, including the channel shaped, guide elements 21 and 22 mounted upon the opposing surfaces of the side jambs 13 and 14, respectively, is provided for controlling the upward and downward movement of the lower section 12 as the upper section 11 is pivoted into, and out of, the horizontal position shown in Figure 4. A pulley assembly 28 (Figure 2), which includes the pulleys 23, 24 and 25 and the line 26 extending around said pulleys and secured at both ends to the lower section 12, is provided for moving the upper and lower sections between the upright, aligned positions shown in solid lines in Figure 3 and the substantially horizontal positions thereof shown in Figure 4. The guide mechanism and pulley assembly combine to control the operation of the garage door 10. An adjustable door stop 27 is associated with the upper end of the upper section 11 for controlling the angular movement, and the horizontal position, of the upper section 11, hence, of the lower section 12 of the garage door 10.

*Detailed construction*

The door frame (Figures 1 and 2), including the side jambs 13 and 14 and the head jamb 16 may be of any convenient, conventional type and used in accordance with standard building practices. The guide channels or elements 21 and 22, which are secured to the side jambs 13 and 14 by means, such as the screws 31 (Figure 11), open toward each other. The exterior flanges 32 and 33 on the guide elements 21 and 22 are turned interiorly to hold the rollers 34 and 35 (Figure 11) within said guide elements 21 and 22, respectively, for reasons appearing hereinafter.

Figure 5:
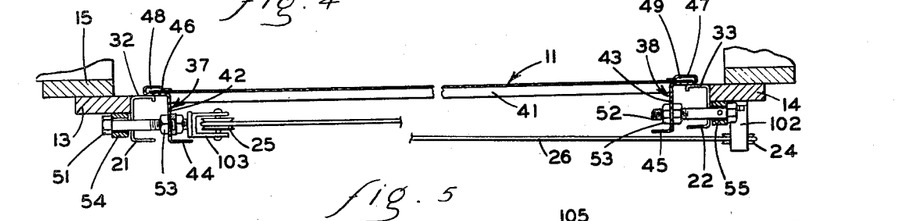
Figure 5 is a sectional view taken along the line V—V of Figure 2.

The upper section 11 of the garage door 10 (Figures 1, 2 and 5), which may be similar to the door shown in Patent No. 2,601,565, is comprised of a pair of stiles 37 and 38, a lower rail 39, and the torque member 18, which provides the upper rail for said upper section. Suitable panels 41 are mounted upon, and supported between, the stiles 37 and 38, the lower rail 39 and the torque member 18 in any convenient manner, such as in a manner similar to that disclosed in Patent No. 2,601,-565, and co-pending application, Serial No. 526,940, filed August 8, 1955 now Patent No. 2,769,513, issued November 6, 1956. The stiles 37 and 38 have substantially parallel, opposing webs 42 and 43, respectively (Figure 5) with inwardly extending flanges 44 and 45, respectively, along their interior edges and outwardly extending flanges 46 and 47, respectively, along their exterior edges. The exterior flanges 46 and 47 may be, as shown here, folded inwardly upon themselves to provide slots 48 and 49, in which the edges of the substantially horizontally arranged panels 41 are received and held in a manner such as that disclosed in more detail in Patent No. 2,769,513, issued November 6, 1956.

A pair of co-axial pivot bolts 51 and 52 (Figures 2 and 5) are secured to the webs 42 and 43, respectively, by means of the nuts 53, and extend outwardly from said webs for pivotal engagement by the pivot brackets 54 and 55 mounted upon the jambs 13 and 14, respectively. Bolts 56 are provided on the brackets 54 and 55 for effecting vertical adjustment of the pivot bolts 51 and 52 with respect to their supporting jambs. In this particular embodiment, the pivot bolts 51 and 52 are located, with respect to the upper edge of the upper section 11, about one-third of the distance downwardly toward the lower edge thereof. The guide elements 21 and 22 extend from the lower edges of the jambs 13 and 14 respectively, to points adjacent to the pivot bolts 51 and 52. Thus, the lower two-thirds of the external flanges 46 and 47 on the stiles 37 and 38, respectively, engage the exterior flanges 32 and 33 (Figure 5) of said guide channels 21 and 22, respectively, when said upper section 11 is in the closed position.

Figures 3, 6, 7, 8:
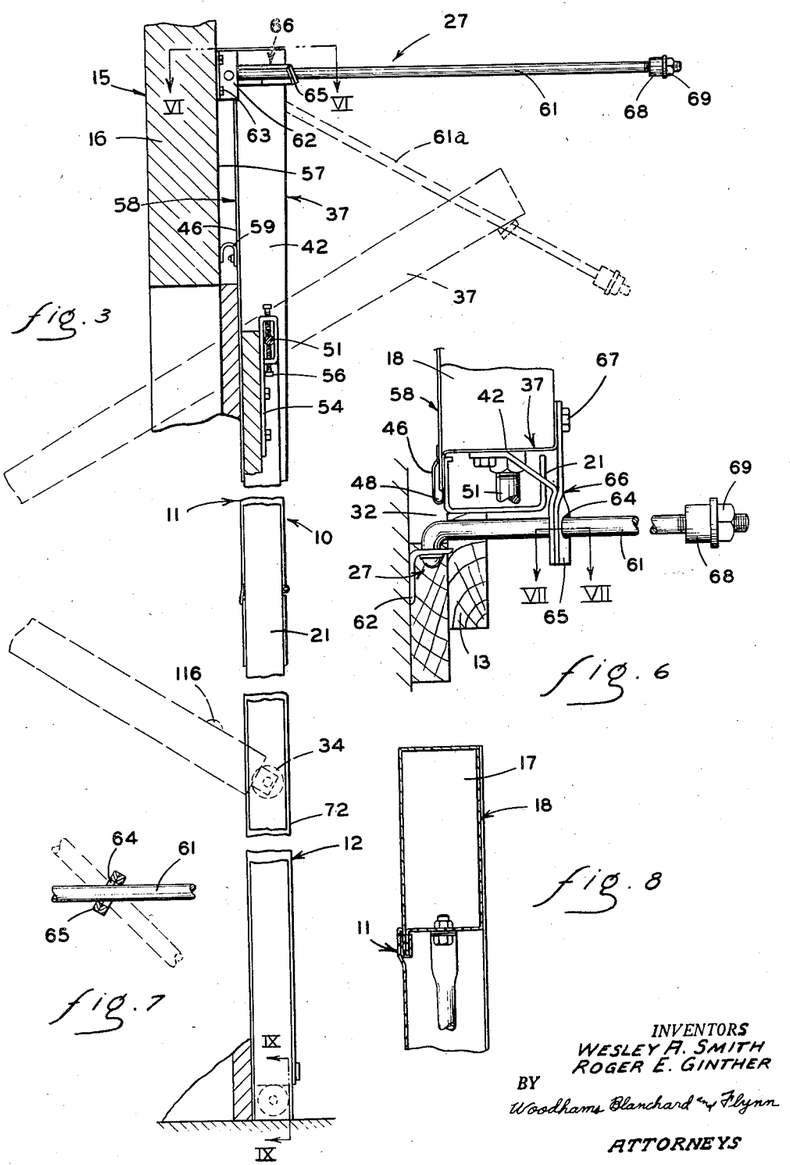
Figure 3 is a broken, sectional view substantially as taken along the line III—III of Figure 2.
Figure 6 is a sectional view taken along the line VI—VI of Figure 3.
Figure 7 is a sectional view taken along the line VII—VII of Figure 6.
Figure 8 is a sectional view taken along the line VIII—VIII of Figure 2.

The pivot bolts 51 and 52 are so located, with respect to the head jamb 16 (Figure 4), that the upper section 11 can move into a substantially horizontal position just below said head jamb without interference therewith. Likewise, both pivot bolts 51 and 52 and the guide elements 21 and 22 are arranged so that the upper end of the upper section 11 will lie adjacent to the interior surface 57 (Figure 3) of the wall structure 15 above the head jamb 16 when said section 11 is in its substantially vertical position. An insulation strip 59 (Figure 3) may be secured to the exterior surface 58 of the upper section 11 in any convenient manner, so that it engages, and forms a weather seal with, the interior surface 57 of the wall 15, when the door is in the closed position (Figure 3). When the door 10 is in its raised position (Figure 4), it slopes downwardly toward the zone enclosed by the wall structure 15, for reasons appearing hereinafter. Thus, the strip 59 also serves to prevent water from moving along the exterior surface 58 into the said zone when the door 10 is raised.

The ballast compartment 17 (Figure 8) provided within the torque member 18 (Figure 2) has a rectangular cross-section, in this particular embodiment, for reception of conventional building bricks as ballast or counterweights. The stiles 37 and 38 may be adjusted angularly with respect to each other and about the axis of the torque member 18 in a manner set forth in Patent No. 2,601,565 for the purposes of fitting and adapting the upper section 11 with respect to the interior surface 57 of the wall 15 and the guide channels 21 and 22.

The door stop 27 (Figures 3, 4 and 6) is comprised of a rod 61 pivotally mounted upon a bracket 62, which is secured by means of bolts 63 upon the interior surface 57 near the left jamb 13. The rod 61 is free to pivot on the bracket 62 about a substantially horizontal axis. The rod 61 slidably extends through a vertically elongated opening 64 in the sidewardly extending flange 65 of the bracket 66, which is secured to the left stile 37 by means of bolts 67. The flange 65 is bent, as shown in Figures 3 and 6, so that the rod 61 will be substantially perpendicular to said flange when said rod is in its mean, pivotal position, as indicated at 61a in Figure 3. Thus, as indicated in Figure 7, the elongation of the opening 64 in the flange 65 may be held to a minimum. A resilient bumper 68 is sleeved upon the rod 61 near the outer end thereof and held in place by a nut 69, for absorbing shock upon the upper section 11 as the upper section moves into the fully open position shown in Figure 4.

Figure 11:
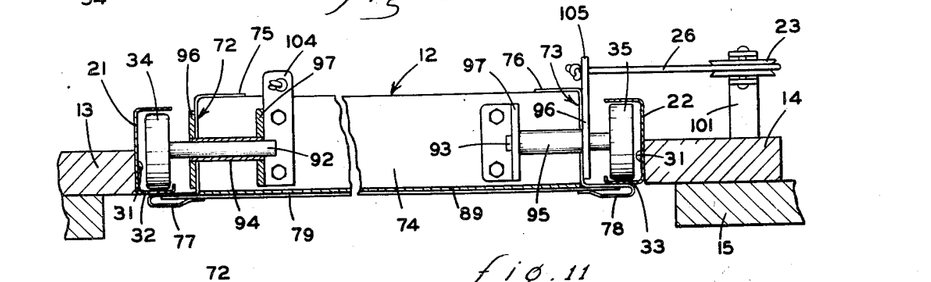
Figure 11 is a sectional view taken along the line XI—XI of Figure 2.
Figure 12:
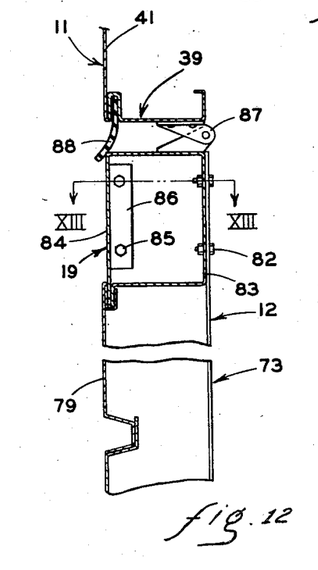
Figure 12 is a sectional view taken along the line XII—XII of Figure 2.

The lower section 12 (Figures 2, 3 and 4) of the door 10 may be substantially similar in structure to the upper section 11, in that it has a pair of stiles 72 and 73, a bottom rail 74 and a torque member 19, which in this embodiment provides the upper rail for said lower section 12. Because of the fact that the torque member 19 is not required to carry ballast, as is the torque member 18 in the upper section 11, it may be of smaller cross-sectional dimension, as indicated in Figure 12. As shown in Figure 11, the stiles 72 and 73 have interior flanges 75 and 76 and exterior flanges 77 and 78, respectively. The exterior flanges engage and support the edges of panels 79, in much the same manner as described hereinabove with respect to the stiles 37 and 38 and the panels 41. The exterior flanges 77 and 78 also engage the exterior flanges 32 and 33 of the guide channels 21 and 22, respectively, when the lower section 12 is in the closed position, thereby providing a weather seal along the side jambs 13 and 14.

Figure 14:
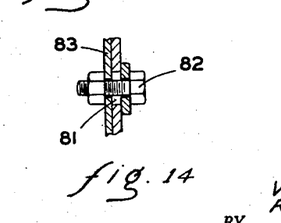
Figure 14 is a sectional view taken along the line XIV—XIV of Figure 13.

The interior flanges 75 and 76 are each provided with a pair of vertically elongated openings, as indicated in Figure 14 by the opening 81, through which bolts 82 extend for the purpose of engaging the rear wall 83 of the hollow torque member 19. Webs of the stiles 72 and 73 are secured with respect to the front wall 84 of the torque member 19 by means of bolts 85, which extend through flanges 86 (Figures 12 and 13), which are secured to the opposite ends of the front wall 84 and extend perpendicularly therefrom. Thus, the relative angular positions of the stiles 72 and 73 radially of, and with respect to, the torque member 19 may be varied by loosening the bolts 82 and 85 and adjusting such angular relationship, after which said bolts are tightened. By this means, and in a manner similar to that discussed in detail in Patent No. 2,601,565, a distortion can be selectively imposed upon, or removed from, the lower section 12 of the door 10.

Figure 9:
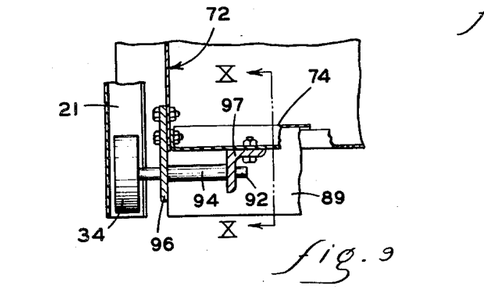
Figure 9 is a sectional view taken along the line IX—IX of Figure 3.
Figures 10, 13:
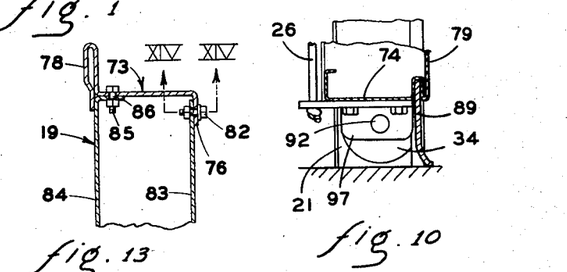
Figure 10 is a sectional view taken along the line X—X of Figure 9.
Figure 13 is a sectional view taken along the line XIII—XIII of Figure 12.

The lower section 12 (Figures 4 and 12) is pivotally supported upon the upper section 11 by means of a plurality of hinge members 87, which are mounted upon the lower rail 39 and torque member 19. The hinges 87 are arranged to provide a space between the lower rail 39 and the torque member 19 of approximately one inch, which is sufficiently large to prevent injury to a human hand which might inadvertently come between said sections during the closing thereof. This space between the upper and lower sections is weather sealed by means of a resiliently flexible strip 88, which is secured to, extends along and depends from the lower rail 39 of the upper section 11. A flexible weather strip 89 is secured to, extends along and depends from, the bottom rail 74 of the lower section 12, as shown in Figures 9 and 10, for the purpose of weather sealing the space between the lower edge of the lower section 12 and the door sill.

The rollers 34 and 35, which are movably disposed within the guide elements 21 and 22 (Figure 11), are mounted upon shafts 92 and 93, respectively, which shafts are rotatably, and axially slidably, supported within the shaft cylinders 94 and 95, respectively. As shown in Figures 9 and 11, each of the shaft cylinders 94 and 95 is secured, as by welding, at its opposite ends to a plate 96 and one flange of an angle member 97. The plates 96 extend along, and are secured to, the respective webs of the stiles 72 and 73, and the angle members 97 are secured, as by bolting, to the web of the bottom rail 74. The interior extensions on the exterior flanges 32 and 33 of the elements 21 and 22, respectively, hold the rollers 34 and 35 within said elements while the lower section 11 moves upwardly and downwardly. Thus, compensation for variations in the perpendicular distance between the side jambs 13 and 14, hence between the guide elements 21 and 22 secured thereon, is automatically effected by the axial movement of the shafts 92 and 93 within the shaft cylinders 94 and 95.

At least one, and sometimes two, latch mechanisms 98 (Figures 1 and 2) are mounted upon the lower section 12 for holding the door 10 closed. Each latch mechanism has a bolt 99 and is supported upon either the left stile 72 or the right stile 73 so that said latch bolt 99 can releasably engage the interior flange on the adjacent guide element 21 or 22, when the lower section 12 is in the fully closed position. Actuation of the latch bolt 99 is effected by handles, of a substantially conventional type, extending from both the interior and the exterior sides of said mechanism 98.

The pulley 23 of the assembly 28 (Figures 2 and 11) is rotatably mounted, by means of the pulley support 101, upon the right jamb 14, adjacent to the lower end thereof, for rotation about a horizontal axis. The pulley 24 (Figures 2 and 5) is rotatably supported by means of the pulley support 102 upon the right jamb 14 adjacent to, and preferably just below, the right pivot bolt 52. The pulleys 23 and 24 preferably have parallel axes, both of which are preferably substantially perpendicular to a plane defined by the door 10 when in its closed position. The pulley 25 is rotatably supported upon the yoke 103, which is in turn pivotally mounted upon the inner end of the left pivot bolt 51, for movement about the axis of said bolt. Thus, for reasons and under conditions appearing hereinafter, the rotational axis of the pulley 25 may vary from a position substantially perpendicular to the plane of the upper section 11 to a position substantially parallel with such plane as said upper section is opened and closed.

The pulley line 26 (Figure 2) which extends around the pulleys 23, 24 and 25, is secured at one end to an interior extension 105 on the plate 96 associated with the support mechanism for the right roller 35. The other end of the pulley line 26 is secured to an interior extension 104 on the angle member 97 associated with the support mechanism for the left roller 34. Thus, the lower section 12 and the upper section 11 can be raised into their horizontal positions (Figure 4), by pulling downwardly on the line 26 between the pulleys 23 and 24, and can be returned to their upright positions (Figure 2) by pulling upwardly on said line 26 between said pulleys 23 and 24. The rollers 34 and 35 serve to guide the lower end of the lower section 12 during such upward and downward movement.

Figures 15, 17:
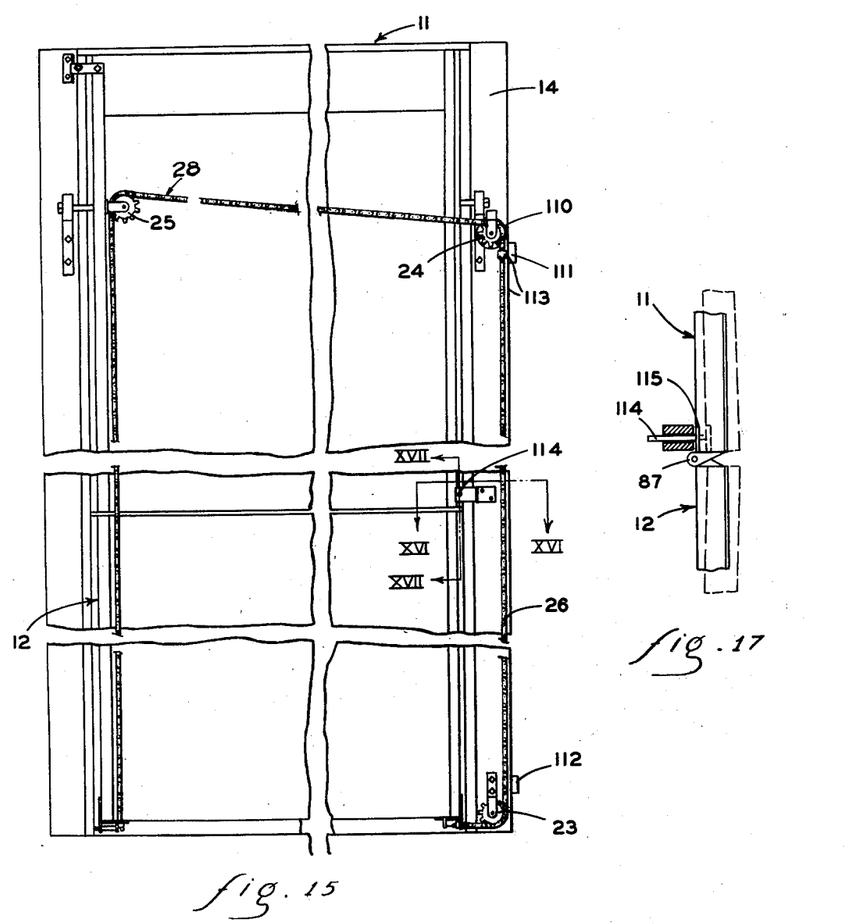
Figure 15 is a broken, rear elevational view of a door, similar to that shown in Figure 2, and adapted for fully automatic operation.
Figure 17 is a sectional view taken along the line XVII—XVII of Figure 15.

As indicated in Figure 15, the upper pulley 24 may be mounted upon the shaft of a motor 100, which is supported upon the jamb 14 and whereby the raising and lowering of the door 10 can be accomplished by power. In such case, the pulleys preferably are replaced by sprockets and the line 26 is replaced by a chain. By mounting suitable means, such as switches 111 and 112 upon the jamb 14 adjacent to the pulleys 23 and 24, respectively, and by supporting a switch operator 113 upon the chain for the purpose of operating the switches 111 and 112, the motor 110 may be automatically de-energized, thereby permitting the use of conventional, remote control means for energizing said motor and thereby opening or closing said door 10. Where the door 10 is opened and closed by power, means such as a solenoid operated bar 114 may be mounted upon the jamb 14 adjacent to the hinge axis between the upper section 11 and lower section 12 for engagement with a bracket 115 (Figure 16), whereby the door 10 is moved outwardly slightly at its hinge axis just before the motor 110 begins to raise said door.

The ballast, or counterweight, in the compartment 17 tends to resist downward or closing movement of the door under ordinary circumstances, and tends to raise the door into its open position, particularly after the door has been partially raised by means of the pulley assembly 28. Thus, in the preferred embodiment of the structure herein disclosed, the ballast is so selected, and the pivot axis of the pivot bolts 51 and 52 is so arranged, that a positive force must be applied to the line 26 to initiate an opening of the door from its closed position or to initiate a closing of the door from its open position. As a result, the door tends to move into its fully closed or fully open position with a positive action, which tends to keep it in that position once it is reached. A resilient bumper 116 (Figure 4) may be mounted upon the interior side of the upper section 11, for example, to cushion a possible contact between it and the lower section 12 as the door moves into its raised position.

Alternate structures

Figure 18:
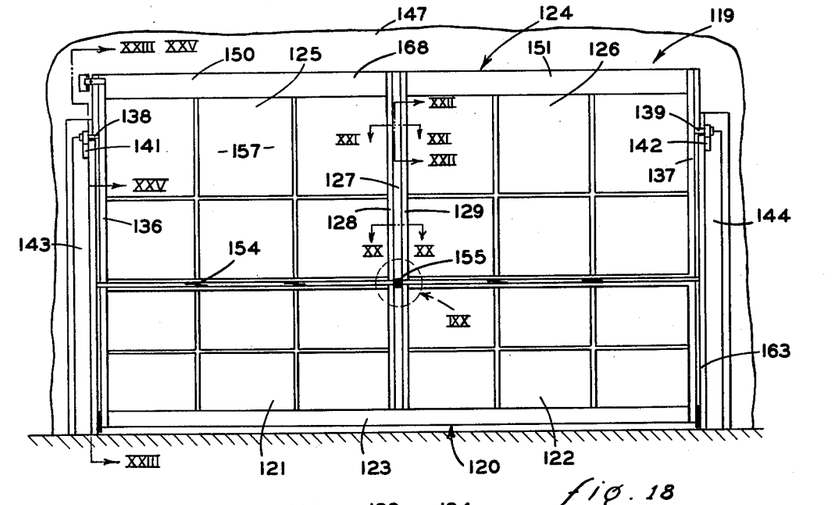
Figure 18 is an elevational view of the interior side of a modified canopy-type closure member.
Figures 23, 26:
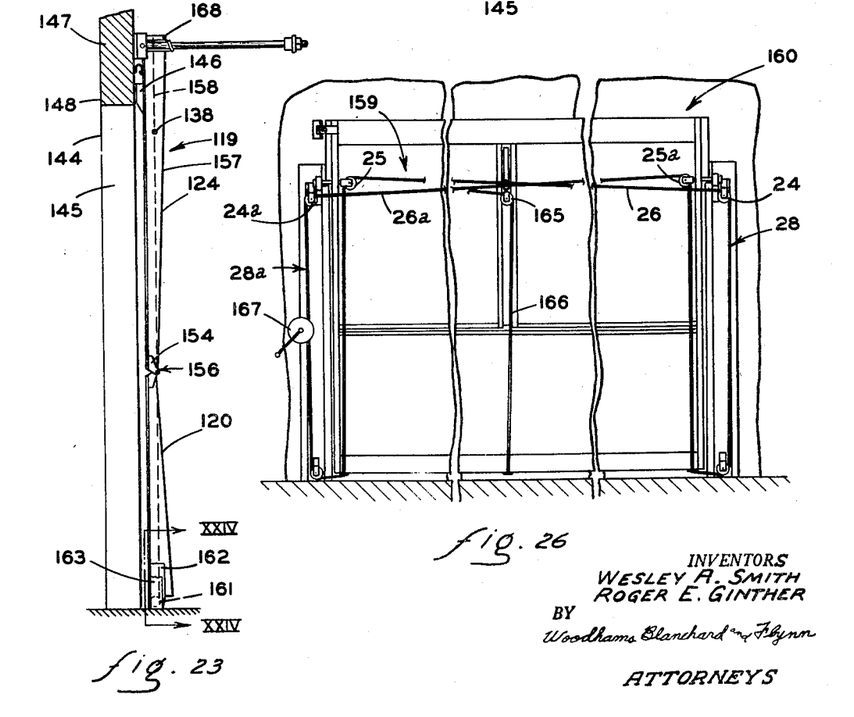
Figure 23 is a sectional view taken along the line XXIII—XIII of Figure 18.
Figure 26 is a broken elevational view showing the interior side of a multiple unit closure member, similar to that shown in Figure 18 and including an alternate pulley and cable assembly for raising and lowering of the closure member.
Figures 24, 25:
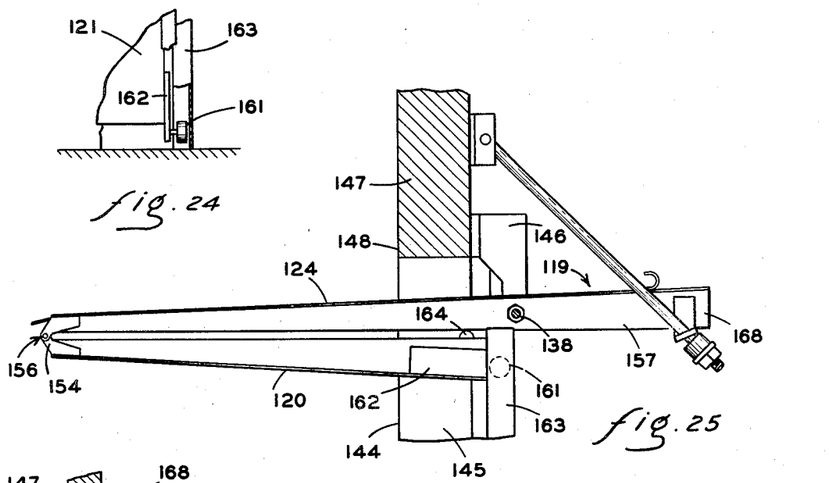
Figure 24 is a broken, sectional view taken along the line XXIV—XXIV of Figure 23.
Figure 25 is a sectional view substantially as taken along the line XXV—XXV of Figure 18, but showing the closure member in a raised position.

As indicated hereinabove, there may be circumstances in which it is desirable to provide a closure member, embodying the features of the door 10, for an opening which is substantially wider than the opening for which the door 10 is best suited to operate. By way of illustration, it is pointed out that doors for domestic-type garages are not only provided in a variety of widths and heights for single openings or single garages, but also in a variety of sizes for double width openings. In a similar manner, commercial-type doors may also be designed and constructed for covering openings ranging from small to medium and from medium to large. The door 10 is designed for the small to medium size opening, as under twenty feet in width, whereas the multiple unit, closure member 119, shown in Figures 18, 23 and 25, is designed for medium to large size openings, as over twenty feet in width.

In this particular embodiment, the door 119 (Figure 18) is comprised of two doors, similar to the door 10, which are joined together along adjacent edges thereof. The door 119 has a lower section 120 and upper section 124. The lower section 120 is comprised of a left segment 121 and a right segment 122, both of which may be generally similar to the lower section 12 of the door 10. A single torque member 123 extends along the lower edges of both segments 121 and 122, for purposes generally similar to those of the torque member 19 shown at the top of the lower door section in Figures 1 to 17 inclusive.

The upper section 124 of the door 119 has a left segment 125 and a right segment 126, each of which may be substantially identical to the upper section 11 of the door 10. The two segments 125 and 126 are held in spaced relationship with respect to each other by means, such as the channel-shaped spacing member 127 (Figures 20 and 21), which is disposed between the adjacent stiles 128 and 129 of the segments 125 and 126, respectively, and extends the length thereof. The segments 125 and 126 are rigidly held with respect to each other by means of bolts 131, which extend through the stiles 128 and 129, as well as through the flanges of the channel-shaped spacing member 127. Spacing sleeves 132 encircle the bolts 131, between the flanges of the spacing channel 127, for preventing movement of said flanges toward each other. The exterior flanges 133 and 134 on the stiles 128 and 129 may abut each other, as shown in Figure 20, for the purposes of appearance and weather-sealing, except for a short portion near the upper end thereof, as shown in Figure 21, and for reasons appearing hereinafter.

The remotely disposed stiles 136 and 137 (Figure 18) of the segments 125 and 126, respectively, are engaged by the pivot bolts 138 and 139 in substantially the same manner, and in substantially the same positions with respect to the upper and lower edges of the upper section 124, as set forth in detail with respect to the pivot bolts on the upper section 11 of the door 10. The pivot bolts 138 and 139 are in turn respectively pivotally supported by means of the brackets 141 and 142, which are mountable in a conventional manner upon the side jambs 143 and 144, respectively, which frames the door opening 145.

The pivot bolts 138 and 139 (Figure 18) support the upper section 124 for movement about an axis substantially parallel with the upper and lower edges of the upper section 124. A support brace 146 is secured, as shown in Figure 22, upon the wall structure 147, preferably just above the head jamb 148, and pivotally engages one of the bolts 131, which is co-axial with the bolts 138 and 139, for the purpose of supporting the center portion of the upper section 124, hence, the door 119. The exterior flanges 133 and 134 (Figure 21) of the stiles 128 and 129 are relieved to permit the pivotal movement of the upper section 124 with respect to the support brace 146. The segments 125 and 126 of the upper section 124 are provided with separate torque members 150 and 151, which may be substantially identical to the torque member 18 in the door 10.

Figures 19, 20, 21, 22:
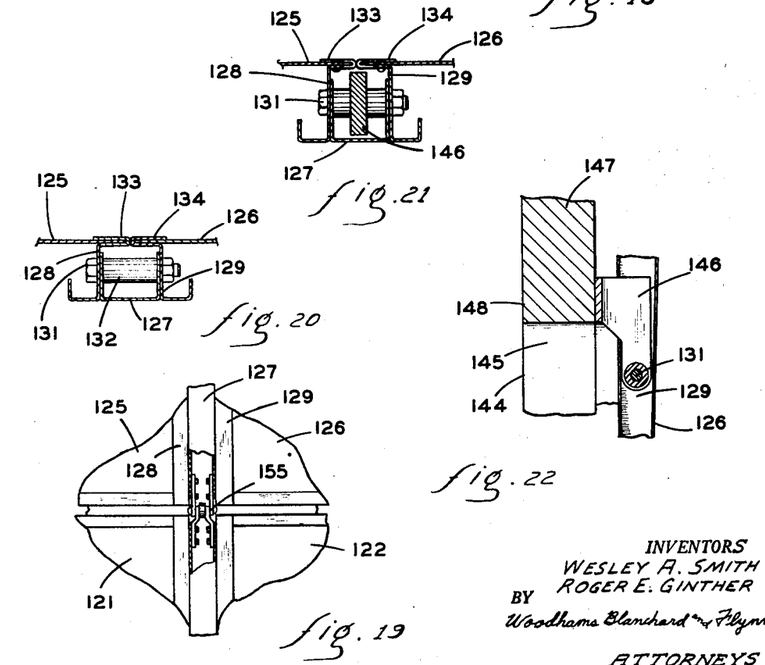
Figure 19 is an enlarged broken fragment of Figure 18, the location of such fragment being indicated by the broken circle IXX—IXX.
Figure 20 is a sectional view taken along the line XX—XX of Figure 18.
Figure 21 is a sectional view taken along the line XXI—XXI of Figure 18.
Figure 22 is a sectional view taken along the line XXII—XXII of Figure 18.

The left and right segments 121 and 122 of the lower section 120 may be held with respect to each other in a manner substantially as shown in Figure 20 with respect to the segments of the upper section 124. However, in addition to such securement, the lower section 121 preferably has a single torque member 123 extending along the lower edges of both of the segments 121 and 122. In order to accommodate this structure, the stiles of the lower segments 121 and 122 are tapered upwardly, as shown in Figure 23. Thus, the thinner portions of the upper and lower sections 124 and 120 are disposed adjacent to each other, where they are connected by hinges 154, which may be substantially similar to those used on the door 10. However, as shown in Figure 19, a special hinge structure 155 is advantageously provided at the center point of the door, where the two upper segments and two lower segments all meet.

As shown in Figures 23 and 25, when the door is in its closed position, the hinge axis 156 is disposed adjacent to, or slightly on the interior side of, the adjacent portion of the interior surface 157 of the door 119. Also, it will be observed that the adjacent edges of the upper and lower sections of door 119 are substantially thinner than the corresponding remote edges of said sections. Thus, it is possible, and preferable, to place the hinge axis 156 so that it lies within a plane, indicated by the broken line 158 in Figure 23, which plane is very close to the centers of gravity of the upper and lower sections when the door 119 is in its fully closed position, as shown in Figure 23. It will be recognized that this arrangement assists gravity materially in effecting a complete closure of the door 119.

Rollers, such as those shown at 161 in Figures 23 and 24, are supported upon the lower edge of the lower section 120 adjacent to the opposite ends thereof, by means of plates 162, for engagement by, and with, guide channels 163 (Figure 25) in substantially the same manner as set forth in detail hereinabove with respect to the door 10. The rollers 161 are, however, preferably mounted as close to the exterior surface of the lower section 120 as possible, for reasons appearing hereinafter. A bumper 164 is provided upon the interior surface of the lower section 120, near the lower edge thereof, for engagement with the upper section 124 when the door 119 assumes the position shown in Figure 25.

The door 119 may be moved from the closed position (Figures 18 and 23) to the open position (Figure 25) by a single pulley assembly, such as that shown at 26 in Figure 2 or 15, where the door is not excessively wide and where a torque member 123 (Figure 18) is provided in the lower edge of the lower section 120 of the door 119. The torque member 123 will provide sufficient rigidity to prevent racking of the lower section 120 as it is moved upwardly by a force thus concentrated at one point thereon. However, where the door 119 is especially wide, as over twenty feet in width, even a torque member 123 in the lower edge of the lower section 120 will not prevent such a distortion in the door as to make the raising of the door difficult. In such cases, it will be advantageous to use a dual pulley system 159, which is comprised of both a pulley assembly 28 (Figure 26) and a pulley assembly 28a, together with, if desired, a center pulley 165 and center pulley line 166. A windlass 167 may be provided, particularly for large doors, to operate the dual pulley system 159 by being connected to the pulley line 28a. It will be recognized that substantially identical results can be obtained by connecting the center pulley line 166 and the windlass 167 to the pulley line 28. As in the case of the door 10, ballast or counterweights will be mounted upon or within the upper end 168 of the upper section 124 of the door 119.

It will be recognized that the use of two segments in the upper and lower sections 124 and 120 of the door 119 is a matter of choice and convenience and that a door 160 having substantially one piece upper and lower sections (Figure 26) may be utilized, if desired. Furthermore, it will be recognized that the right segments 122 and 126 of the door 119 may be entirely independent of the left segments 121 and 125, thereby permitting one half of the door 119 to be opened while the other half is closed. Due to the light weight door structure permitted as a result of the invention, the support brace will provide an adequate replacement for the center post which is often otherwise required to support two adjacent and separately operable doors.

*Operation*

While the operation of the door 10 (Figures 1 and 2) has been somewhat indicated above, it will now be reviewed in detail for the purpose of insuring a complete disclosure.

Turning first to the normal installation of the door 10, the brackets 54 and 55 (Figure 2) are first mounted upon the jambs 13 and 14, respectively, after which the pivot bolts 51 and 52 are disposed within the brackets 54 and 55, respectively, and secured to the webs of the stiles on the upper section 11 by means of the nuts 53. The bolts 51 and 52 are adjusted by means of the bolts 56 until the door is properly disposed between the side jambs 13 and 14 and with respect to the head jamb 16. The stiles 37 and 38, as well as the stiles 72 and 73, are then adjusted with respect to their torque members 18 and 19, respectively, either in the manner set forth above with respect to the torque member 19, or in the manner set forth in detail in Patent No. 2,601,565, until the external flanges 44 and 45, 77 and 78, of said stiles properly engage the external flanges 32 and 33 of the guide elements 21 and 22. Where only one latch 98 is used, a better seal is obtained by distorting the door slightly so that the edge thereof remote from the latch engages its adjacent guide element first. This arrangement can be accomplished by appropriate adjustment of the stiles with respect to their torque members 18 and 19. The insulation strip 57 and the weather strips 88 and 89 will normally be mounted upon the door 10 prior to installation thereof.

The stop rod 61 and the stop rod bracket 62, which may be installed on either the left or right side of the door, are here shown on the left side. The nut 69 is adjusted along the stop rod 61 so that the upper section 11 will slope downwardly and interiorly at an angle of approximately 3°, for reasons appearing hereinafter.

Starting with the door in its closed position, as shown in Figures 1 and 2, the operator may grasp a portion of the line 26 between the pulleys 23 and 24 and pull it downwardly. Alternatively, such downward motion of said portion of the line 26 may be effected by power applied at any convenient point thereon, such as by and at the pulley 24 as above set forth in connection with Figure 15. Simultaneously, the operator urges the portion of the door adjacent to the hinges 87 outwardly. The line 26, being fastened to the lower end of the lower section 12 of the door, pulls said lower section upwardly and this, as best shown by broken lines in Figure 3, effects an upward and outward movement of the lower end of the upper section 11 and thereby a rotation of the upper section on the pivot pins 51 and 52. Because of the rigidity imparted to the entire assembly by the use of the torque tubes 18 and 19, and particularly by the use of the torque tube 19 in the lower section 12, the door moves upwardly smoothly and easily to eventually occupy the position shown in Figure 4, even though the force is applied only at the extreme side of the door. The nut 69 is adjusted so that the bumper 68 engages the stop 66 and terminates upward movement of the door assembly just before the lower section 12 comes into contact with the upper section 11. The resilient bumper 116 (Figure 4) cushions any contact which may occur between the two sections as they move into the raised position.

Figure 4:
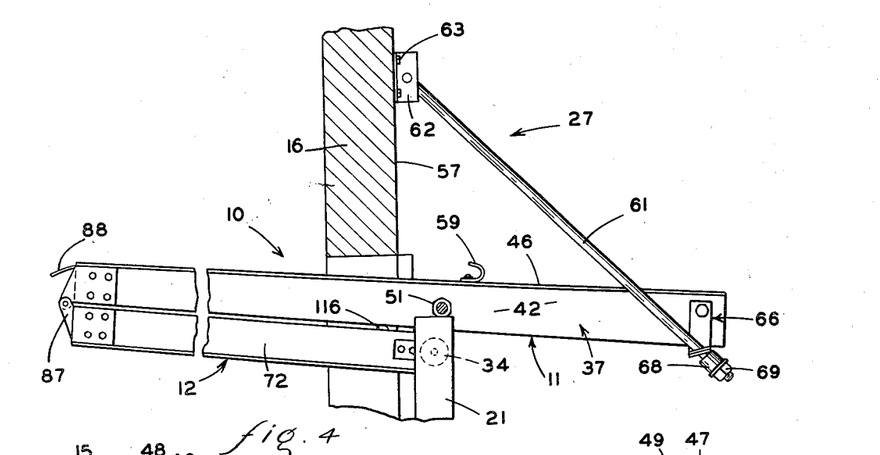
Figure 4 is a broken, sectional view taken along the line IV—IV of Figure 2, but showing the door in the open or raised position.

As the door moves upwardly, the weight of the door and the frictional drag imposed by the rollers 34 and 35 within the channels 21 and 22 must be overcome by the force applied to the line 26 and the counterweight in the compartment 17 of the upper section 11. However, when the lower section 12 reaches a substantially horizontal position, then its upper end, namely, the leftward end as appearing in Figure 4, is enabled to follow the lower end of the upper section, namely, the leftward end as appearing in Figure 4, without further upward movement of the rollers 34 and 35. In other words, at this point the lower section merely pivots on said rollers as its leftward end moves further upwardly and does not have to drag said rollers further upwardly. Thus, the force resisting further clockwise rotation, as appearing in Figure 4, of the upper section of the door is rather suddenly removed and the door responds to the force of the counterweight in its compartment 17 to move rather quickly under gravity into the position shown in Figure 4, namely, a position where the upper section of the door has rotated slightly more than 90° from its closed position and the lower section of the door has its leftward, or outward, end raised slightly beyond the horizontal.

Theoretically, the pivot points defined by the hinges 87, the pivot bolts 51 and 52 and rollers 34 and 35 form a triangle such that the hinges 87 cannot move upwardly after the lower end of the lower section 12 has come to a stop against the upper section 11. However, the slack or clearances between the rollers and guide channels are such that, even after the rollers 34 and 35 come to a stop, the hinges 87 can move upwardly, due to the urging of the counterweight, to permit the parts to assume the position shown in Figure 4. The door when in this position resists closure which might be caused by snow loads or wind to a much greater extent than it does when the lower section is lowered slightly. In fact, closure of the door normally requires the express and intentional downward movement of the lower end of the lower section 12.

There is a slight upward slant to the exterior portion of the door structure when it is in the raised position which tends to hold the door in a raised position. When the door 10 is in this raised position, the axis of the hinge 87 will be above the level of the axes of the rollers 34 and 35. Thus, as shown in Figure 4, the centerline between the hinge axis and roller axes will be an obtuse angle with respect to the lengthwise extent of the guide channels 21 and 22. Accordingly, the channels 21 and 22 will oppose downward movement of the rollers 34 and 35, when the door is in its Figure 4 position, thereby positively holding the lower section 12 up against the upper section 11.

Closing of the door is initiated by manually grasping a portion of the line 26 at a point between the pulleys 23 and 24, or otherwise moving said line under power as above indicated, and effecting an upward movement of said portion of said line. This moves the line 26 around the pulley 23 and acts on the bracket 95 to pull the lower end of the lower section 12 directly downwardly, which releases the door from the position as appearing in Figure 4. As soon as the door reaches a position in its downward movement where the weight of that part of the door which lies below the pivot bolts 51 and 52 overcomes the friction of the rollers 34 and 35 and counterbalances the effect of the counterweight in the compartment 17 of the upper section 11, the door will then close automatically under its own weight. Thus, operation of the door can be controlled by the amount of ballast placed in the compartment 17. In the typical embodiment herein illustrated, this balance point occurs when the door parts are in approximately the position shown in broken lines in Figure 3. Normally when the door moves below this balance position, the gravity forces acting thereon will be sufficient to close the door under sufficient force that the hinge portion thereof will move tightly against the flanges 32 and 33 provided by the guide elements 21 and 22 and, if a latch 98 is provided on the door, the latch will be actuated to hold the door firmly closed. Thus, sufficient slamming effect may be obtained without injury to the door structure that the door will close and its latch will be actuated without attention from the operator at this point.

Figure 16:
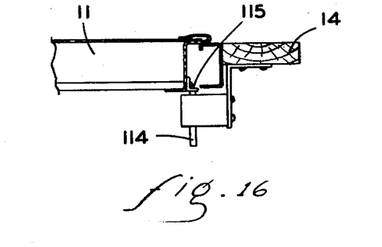
Figure 16 is a sectional view taken along the line XVI—XVI of Figure 15.

The mechanism disclosed in Figures 15, 16 and 17 is intended only to be illustrative of one acceptable device for effecting automatic or semi-automatic operation of the door.

In general, the operation of the door 119 (Figures 18 to 26) is similar to the operation of the door 10 and needs no further detailing. However, certain unique characteristics of operation exist with respect to the door 119 which will now be described for a more complete understanding thereof.

The door 119 will occupy, in the fully raised position, a position such that the exterior surface of the upper section 124 will slope downwardly and outwardly at a small angle, such as an angle of approximately 1.5°, the interior surface of said upper section being substantially horizontal. The hinge axis 156 will be directly below the axis of the pivot bolts 138 and 139 and above the axis of the guide rollers 161. As in the case of the door 10, the critical aspect of this arrangement resides in the fact that the hinge axis 156 is above the axis of the guide rollers 161 when the bumper 164 (Figure 25) on the lower section 120 contacts the upper section 124. Thus, due to the fact that when the door 119 is in its fully raised position a line from the hinge axis 156 to the rotational axis of the rollers 161 is at an angle of more than 90° to the lengthwise extent of the guide channels 163, there will be a component of force created by the counterweight in the upper end 168, which will continue to urge the lower edge of the lower section 120 upwardly and, therefore, firmly against the upper section 124. This is generally similar to the effect accomplished with respect to the door 10 by providing sufficient tolerance to permit the upper section thereof to assume an upwardly and exteriorly sloping attitude, as discussed hereinabove.

The axes of the guide rollers 161, when the door is in raised position, are sufficiently close to the level of the hinge axis 156 that a load imposed upon the outer, exterior end of the door, will not produce a lowering of the door, except under unusual load conditions, such as excessive amounts of snow or ice. Thus, lowering can normally be accomplished only by positively urging the lower edge of the lower section 120 downwardly, as by operating the pulley system 159. As in the case of the door 10, the door 119 passes through a transitional position in both its upward and downward movement, where the gravitational effect upon the upper end 168 is respectively greater than, or less than, the gravitational effect upon the remainder of the door. As the door is moving downwardly into its closed position, the gravitational effect upon the lower portion of said door is effectively utilized for completely closing the door. Inasmuch as the hinge axis 156 of said door 119 lies within a plane 158 passing through the centers of the upper and lower sections, there is a positive tendency for the door to close fully in response to gravity even though such closing involves the operation of a latching mechanism, such as a conventional latch indicated at 98 in Figure 2.

Thus, although particular, preferred embodiments of the invention have been disclosed hereinabove for illustrative purposes, it will be recognized that variations or modifications thereof, which do not depart from the scope of such disclosure, are fully contemplated unless specifically stated to the contrary in the appended claims.

We claim:

1. In a closure structure for an opening in an upright wall, the combination comprising: an upper panel arranged for pivotal movement around a horizontal axis intermediate its upper and lower edges for movement into open and closed positions, said upper panel having a counterweight at its upper edge and being tapered convergingly downwardly; a lower panel having its upper edge pivotally affixed to the lower edge of the upper panel and having its lower edge arranged for vertically sliding movement in a vertical plane substantially passing through said horizontal axis, said lower panel having a hollow structural member arranged along its lower edge and rigidly affixed thereto, said lower panel tapering convergingly upwardly; hinge structure between said upper and lower panels for hingedly connecting same, said hinge structure being positioned interiorly of the interior surface of said panels whereby said panels when in full open position may lie substantially against each other with the outer surface of the upper panel sloping outwardly and downwardly and the outer surface of the lower panel sloping downwardly and inwardly, the pivot line of said hinge structure, said horizontal axis and a point near the outer part of the lower edge all lying within said vertical plane when said door is in its closed position.

2. The device defined in claim 1 wherein the lower edge of the lower panel is held substantially within said vertical plane in all positions of said door, whereby when said door is in its full open position and the lower panel and the upper panel are contacting each other, the hinge axis between said panels is located vertically above said holding point of said lower panel.

3. In a closure structure for an opening in an upright wall, said structure including upper and lower panels hingedly connected along adjacent horizontal edges, the combination comprising: a pair of aligned, horizontal pivot shafts fixed in vertically non-movable position on the side edges of said opening near the upper end thereof and extending toward each other, said shafts being pivotally secured respectively to the respective side edges of said upper panel between the upper and lower edges thereof to support same for pivotal movement about a horizontal, vertically non-movable axis; a guide track secured to each of said side edges of said opening and extending upwardly thereon from adjacent the lower edge thereof to a point adjacent said pivot shafts; a pair of guide rollers secured, respectively, to the respective side edges of said lower panel adjacent the lower end thereof, said guide rollers being received in the respective guide tracks; and means for opening and closing said closure structure including a pair of pulleys mounted on said wall adjacent one side of said opening and positioned adjacent the lower end thereof and adjacent the pivot shaft thereon, respectively; a third pulley rotatably mounted upon the upper panel adjacent the other pivot shaft; and an elongated, flexible element extending around said pulleys and connected at its respective ends to said lower panel near the lower end thereof and adjacent the respective side edges thereof.

4. In a closure structure for an opening in an upright wall, the combination comprising: an upper panel arranged for pivotal movement around a horizontal axis intermediate its upper and lower edges for movement into open and closed positions, said upper panel having a counterweight at its upper edge and being tapered convergingly downwardly; a lower panel having its upper edge pivotally affixed to the lower edge of the upper panel and having its lower edge arranged for vertically sliding movement in a vertical plane substantially passing through said horizontal axis, said lower panel tapering convergingly upwardly; hinge structure between said upper and lower panels for hingedly connecting same, said hinge structure being positioned interiorly of the interior surface of said panels whereby said panels when in full open position may lie substantially against each other with the outer surface of the upper panel sloping outwardly and downwardly and the outer surface of the lower panel sloping downwardly and inwardly, the pivot line of said hinge structure, said horizontal axis and a point near the outer part of the lower edge of the lower panel all lying within said vertical plane when said door is in its closed position.

5. In a closure structure for an opening in an upright wall, said structure including upper and lower panels hingedly connected along adjacent horizontal edges, the combination comprising: a pair of aligned, horizontal pivot shafts fixed in vertically non-movable position on the respective side edges of said opening near the upper end thereof and extending toward each other, said shafts being pivotally secured, respectively, to the respective side edges of said upper panel between the upper and lower edges thereof to support same for pivotal movement about a horizontal, vertically non-movable axis; a guide track secured to each of said side edges of said opening and extending upwardly thereon from adjacent the lower edge thereof to a point adjacent said pivot shafts, a pair of guide rollers secured, respectively, to the respective side edges of said lower panel adjacent the lower end thereof, said guide rollers being received in the respective guide tracks; an elongated rod pivotally secured to said wall adjacent the upper edge of said upper panel; a bracket secured to said upper panel and having an opening therein through which said rod loosely passes; stop means on the end of said rod remote from said wall for blocking movement of said rod through said opening therebeyond to thereby determine the maximum angle between the upright and horizontal positions of said upper panel; a pair of pulleys mounted on said wall adjacent one side of said opening and positioned adjacent the lower end thereof and adjacent the pivot shaft thereon, respectively; a third pulley rotatably mounted upon the upper panel adjacent the other pivot shaft; and an elongated flexible element extending around said pulleys and connected at its respective ends to said lower panel near the lower end thereof and adjacent the respective side edges thereof whereby the lower edge of said lower panel may be urged upwardly or downwardly to thereby effect opening and closing of the closure structure.

6. A canopy type closure for an opening in an upright wall, comprising in combination: an upper panel and a lower panel and means hingedly connecting said upper and lower panels along a hinge axis at their respectively adjacent edges; a mounting pivot affixed to said upper panel intermediate the upper and lower edges thereof for pivotally relating said upper panel to said wall and means mounting said mounting pivot onto said wall adjacent the upper edge of said opening and spaced from one surface of said wall such a distance as to permit said door to bear snugly against said surface of said wall when same is in a closed position; a pair of track members arranged at either side of said opening and rigidly mounted with respect to said wall and having inner and outer track elements, said outer track elements being coplanar with each other and defining a first and fixed plane substantially parallel with the plane occupied by said door when in its closed position and said second track elements being coplanar with each other and defining a second and fixed plane parallel with said first plane and spaced therefrom in a direction opposite the spacing therefrom of said wall, said track elements extending from a point closely adjacent the lower extremity of said opening to a point closely adjacent the upper extremity of said opening and immediately below said mounting pivot; a pair of guide members positioned respectively between said first and second track elements of said track, said guide members each snugly fitting between the track elements between which they are respectively placed, and means pivotally connecting said guide members to the lower edge of said lower panel; a counterweight at the upper edge of the upper panel of sufficient weight to move said closure structure without assistance from other means from an at least partially open position into its full open position; said mounting pivot and said hinge axis being spaced apart a first distance, said first distance, being not materially different than a second distance, said second distance being the distance from said guide members to said hinge axis, and said two last-named distances further being such that when said upper panel is in substantially horizontal position said hinge axis is above the respective points by which said guide members bear against said first track elements and said second distance being long enough with respect to said first distance that the guide members are able to move upwardly at least close to the upper panel but, when in such position urged with a substantial force against said first track portions to provide an upward component of said force to urge said guide members upwardly; whereby when said door is in at least a partially open position said counterweight will without assistance from other lifting means apply sufficient force solely through said hinge axis and through said lower panel to said guide members that the guide members will be lifted towards the top of said tracks and said door will thereupon open.

References Cited in the file of this patent

UNITED STATES PATENTS

| | | |
|---|---|---|
| 1,378,127 | Ogden | May 17, 1921 |
| 1,709,872 | Peelle | Apr. 23, 1929 |
| 1,947,691 | Baldwin et al. | Feb. 20, 1934 |
| 2,148,674 | Atwood | Feb. 28, 1939 |
| 2,238,181 | Morgan | Apr. 15, 1941 |
| 2,362,789 | Workman | Nov. 14, 1944 |
| 2,366,793 | Kuchner | Jan. 9, 1945 |
| 2,601,565 | Smith | June 24, 1952 |